United States Patent Office 3,032,754
Patented May 1, 1962

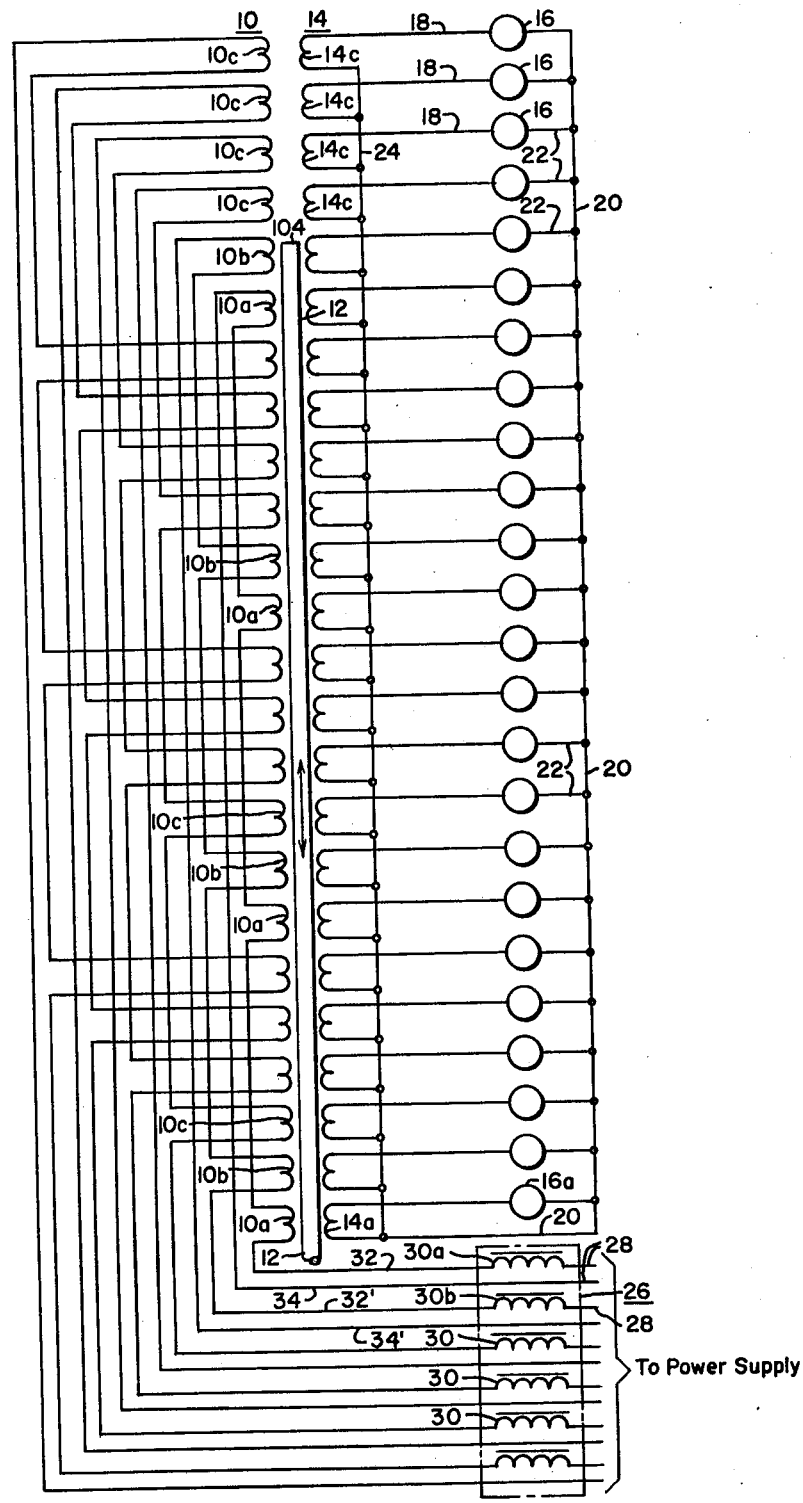
Fig. I.

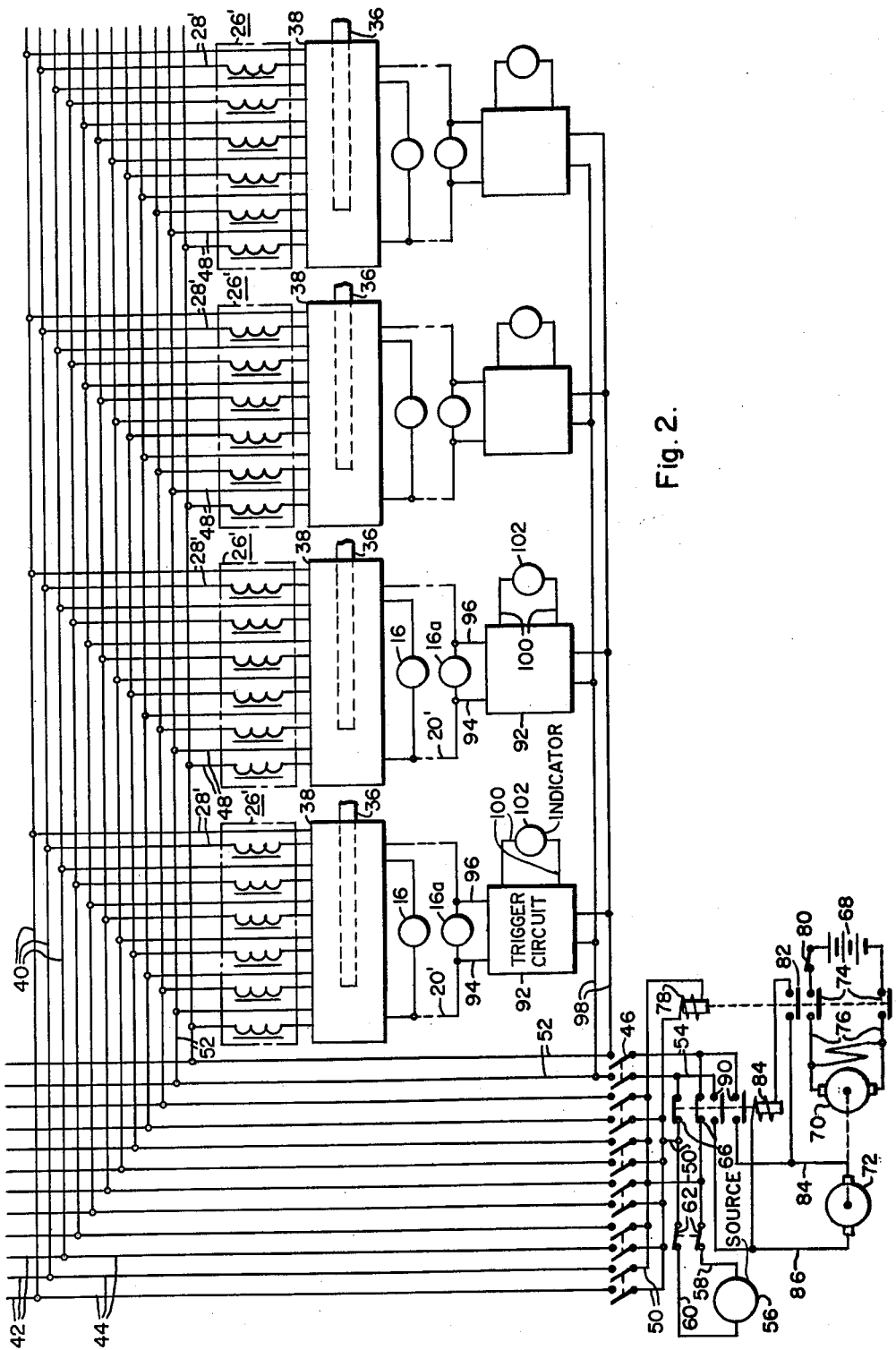

3,032,754
POSITION INDICATOR
William P. Di Pietro, Pittsburgh, Pa., assignor to Westinghouse Electric Corporation, East Pittsburgh, Pa., a corporation of Pennsylvania
Filed Nov. 21, 1957, Ser. No. 697,828
8 Claims. (Cl. 340—282)

The present invention relates to a device for indicating the position of an element moving through a predetermined path, and more particularly to a device of the character described for yielding an instantaneous visual indication of the position of the element at any given position within its path.

In certain aspects of the invention, it is adapted for use with a plurality of the aforesaid elements, which likewise are moving through individually prescribed paths in a manner such that personnel responsible for the operation of the elements may determine, with a glance at the associated visual indicia, the approximate positions of all of these elements. In other aspects of the invention, the position indicator is arranged in a manner to energize suitable alarm or visible indicia when one or more of these elements has been moved to a predetermined position within the aforesaid paths.

Heretofore, it has been the practice, in order to indicate the position of a moving element as aforesaid, to dispose a plurality of series, or parallel-series wound induction coils along the length of the paths in which the element is moving. When the element or a portion thereof is fabricated from magnetic material, the total change in inductance of the coils indicates the approximate position of the element in its path. In this prior arrangement, however, a sensitive electrical metering circuit is required in order to measure the change in inductance of the position indicating coils. Since this metering circuit usually involves at least initially the balancing of an inductance bridge, or the like, the measurements thus obtained from the metering circuit are time consuming, and accordingly, this arrangement does not lend itself well to indicating the position of a rapidly moving element, or more particularly to a plurality of rapidly moving elements.

Other known position indicating schemes required series of electrical contacts which are, of course, subject to wear when in use or on the other hand compel the operator to read a series of electrical meters which likewise makes it difficult for the operator to follow the movements of a plurality of the aforesaid elements in these prior arrangements. Moreover, insofar as is known, none of these prior position indicating arrangements incorporates additional indicating means which are capable of being energized when the moving element has reached a predetermined position within its prescribed path.

In view of the foregoing, it is an object of the invention to provide a novel and efficient position indicating arrangement.

Another object of the invention, is to provide a position indicating arrangement which is adapted, in one application thereof, for use with a plurality of moving elements.

A further object of the invention is the provision of a position indicating arrangement which is adapted to yield visual indications of the positions occupied by one or more moving elements.

Still another object of the invention, is the provision of a position indicating arrangement which is arranged for indicating positions of a plurality of moving elements and which has additional indicating means associated therewith capable of being energized when one or more of the aforesaid elements are moved to predetermined positions within their respective paths. The aforesaid means is further arranged to indicate the particular ones of these elements which have been so moved to corresponding predetermined positions.

These and other objects, advantages, and features of the invention will be elaborated upon as this description proceeds when taken in conjunction with the accompanying drawings, wherein:

FIGURE 1 is a schematic circuit diagram of one form of position indicating arrangement constructed in accordance with the principles of this invention, and FIG. 2 is another form of position indicating arrangement made pursuant to the teachings of this invention and adapted in an exemplary manner for use with a plurality of moving elements.

In accordance with the invention, a series comprising a plurality of transformer windings, each including separate primary and secondary windings, are arranged along the path of travel of the movable element whose position it is desired to indicate. The movable element is at least partially fabricated from a magnetic material, at least in that portion thereof which may be disposed adjacent one or more of the transformer windings throughout the length of its travel. Means are also associated with the invention for maintaining a substantially constant output in the aforesaid secondary windings irrespective of the number of such windings which are coupled to their respective primary windings at a given time by the magnetic material of the moving element. In other applications of the invention, a plurality of series of transformer windings are disposed, respectively, adjacent the paths of a like plurality of moving elements for indicating the positions of all of these elements at a given instant. Suitable and visual indicia are coupled to each secondary winding, respectively, and as one or more of these windings are coupled to their respective primary windings by the moving element, an instantaneous indication of the positions occupied by the elements is obtained. In another aspect of the invention, additional position indicating means are associated with the aforedescribed arrangement for indicating when one or more of the aforesaid elements have reached a predetermined position in their respective paths.

In another aspect of the invention, an emergency power supply is coupled to selected ones of the aforesaid primary windings in order that the power of the emergency power supply will be conserved by energizing only a portion of the aforesaid visual indicia. In one example of the invention, these primary windings are spaced along the path of the associated element in order that a rough indication of position still will be obtained. In another arrangement of the invention, the aforesaid additional position indicating means is coupled also to the emergency power supply in order that the aforesaid predetermined positions of the elements will be indicated in the event of failure in the main power system.

Referring now more particularly to FIG. 1 of the drawings, the illustrative form of position indicating arrangement shown therein comprises a plurality of primary transformer windings 10 which are mounted in closely spaced relationship along substantially the entire length of travel or path of a moving element 12. Supported at positions adjacent the primary windings 10, respectively, are a like number of separate secondary transformer windings 14, which thus, are spaced in a similar manner along the path of the element 12. The primary and secondary windings can be mounted individually adjacent the element 12 upon suitable non-magnetic supports. Alternatively, each pair of primary and secondary windings can be wound coaxially about the path of the element 12, for example, upon an elongated relatively closely fitting, stationary housing (not shown) surrounding the element 12 and in which the element is mounted for substantially longitudinal movement thereof. At least a portion of the element 12 is fabricated from a magnetic material and this portion is approximately equal to the entire length of travel of the element and is that portion which is inserted or removed from between various ones of the primary and secondary windings 10 and 14 as the element 12 is moved throughout its path, to increase or decrease the magnetic coupling between the several primary windings and their individual secondary windings.

Each of the secondary windings 14 is coupled in series with an electrically operated visual indicating means, for example, an incandescent lamp 16. In furtherance of this purpose, one end of each secondary winding 14 is connected to its associated lamp 16 through the associated one of conductors 18, with the circuits comprising, respectively, each of the secondary windings 14 and its associated electric lamp 16 being then completed through a common conductor 20, to which each of the lamps 16 is connected by means of individual conductors 22, and a second common conductor 24, which is coupled to the remaining ends, respectively, of the secondary windings 14.

Each electric lamp 16 and its corresponding secondary winding 14, together with the associated primary winding 10 form one group of 24 such groups which are utilized in this example of the invention for a single movable element 12. The primary windings 10 are connected, in a manner presently to be described, to a constant current system, denoted generally by the reference character 26, and thence by means of conductors 28 to a suitable power supply, one example of which is presently to be described.

In this arrangement of the invention, selected groups of the primary windings 10 are connected in series with choke coils 30, which are the principal components, in this example, of the aforementioned constant current system 26. Thus, for example, the primary windings 10a are coupled in series with one another and with the choke coil 30a by means of electrical leads 32 and 34; the primary windings 10b are connected in a similar manner to the choke coil 30b through the leads 32' and 34'; and so on. With this arrangement, a total of six choke coils 30 are connected each to a group of four serially connected primary transformer windings 10 through the conductors 32 and 34; however, larger or smaller groups of primary windings 10 obviously can be coupled in the manner aforedescribed to a constant current system (not shown) employing choke coils of differing values. One reason for connecting the primary windings 10 and the chokes 30 in this fashion follows from the fact that the combined voltage drops associated with the components of each of these groupings are such that each grouping can be coupled conveniently to the normal 60 cycle alternating current line. Hence all of these groupings are coupled in electrical parallel to the line through the conductors 28.

In this arrangement of the invention, the primary circuits or groupings as illustrated in FIG. 1, additionally are employed in order that, in event of failure in any of the individual circuits, comprising as aforesaid four of the primary windings 10 and one of the choke coils 30, only four of the lamps 16 will be removed from service and an approximate position of the linear element 12, still will be indicated by the remaining primary windings 10 and lamps 16. In furtherance of this purpose, the four primary windings comprising each of the aforesaid primary circuits, for example, the windings 10a or 10b are spaced at approximately equal intervals along the path of the linear element. With this arrangement then, should a single failure eliminate four of the associated lamps 16, the remaining lamps will still yield an approximate position of the linear element 12. Although the primary windings 10 of each of the primary circuits or groupings are spaced evenly along the length of the path to facilitate making circuit connections thereto and the like, in order to accomplish the purpose of the invention it is merely necessary to avoid placing the primary windings which are coupled to a single one of the choke coils 30 at adjacent positions along the path of the element 12.

The choke coils 30 are employed more specifically to maintain in a known manner a constant induced voltage within each of the secondary windings 14, irrespective of the number of these windings which are magnetically coupled to the associated primary windings 10 at any given position of the element 12 within its path. With this arrangement then, a substantially constant induced voltage is applied to energized ones of the lamps 16 regardless of the position of the element 12 and the number of secondary windings 14 magnetically coupled thereby.

In one arrangement of the invention, sufficient voltage is applied to the primary windings 10 such that when a portion of the element 12 is not adjacent thereto, the air coupling between the primary windings, for example, those indicated at 10c and the associated secondary windings 14c, will be such that the voltage induced in the secondary winding will be in the order of 0.2 volt, on the other hand, when the element 12 is positioned in magnetic coupling relationship between a primary winding 10 and its corresponding secondary winding, the value of the aforesaid air coupling may be increased by a factor of 10, depending upon the magnetic structure of the adjacent portions of the element 12 and the proximity of the primary and secondary windings thereto. In this arrangement, then, the lamps 16 are rated at the latter mentioned output of the individual secondary windings and therefore, obviously will not be energized visibly by the aforesaid air coupling value of these windings. With this arrangement then, the height of the column of visibly energized lamps 16 will correspond to the height or position of the element 12 within its path when the element and the aforedescribed position indicating arrangement are orientated to the position as illustrated in FIG. 1. If the exact position of the movable element 12 is desired relative to the necessary spacing between any pair of adjacent secondary windings, the same can be determined by measuring the voltage across the uppermost lamp 16 which is lit. This voltage when indicated upon a suitably calibrated meter will indicate the exact position of the upper end 104 of the element 12 relative to the position of the secondary winding coupled to the last-mentioned lamp. Otherwise, the energization of the lamps 16 will, of course, represent increments of movement of the element 12 which are equivalent to the distance between adjacent ones of the secondary windings 14. However, an approximation of element position between these adjacent secondary windings can be determined visually from the degree of brightness imparted to the uppermost one of the lamps 16 which is lit, inasmuch as the voltage which is applied to those lamps changes linearly with motion of the element being monitored.

In other applications of the invention, the primary windings 10 can be provided in the form of a continuous single primary winding (not shown) extending approximately the total length of travel of the element 12 and one or more of the secondary windings 14 will be coupled thereto, as the element moves along its path. In this latter arrangement, the operation of the lamps 16 will be somewhat similar to that described heretofore.

It is also contemplated that two or more primary windings (not shown) can be substituted for the windings 10, which are less in number than the total number of secondary windings 14 illustrated but which are juxtaposed to groups of the secondaries and thus extend an equivalent distance along the path of the element 12. When two or more of the latter-mentioned primaries are utilized, however, the use of constant current circuitry including one or more of the choke coils 30 will be advantageous.

Referring now to FIG. 2 of the drawings, the aforedescribed position indicating arrangement is further arranged for use with a plurality of moving elements 36 and additional means is shown in FIG. 2 in association with the indicating arrangement for showing which ones of these elements have been moved to a predetermined position within their respective paths. In this latter arrangement of the invention, the linear elements 36 are mounted for movement in individual paths through respective series of primary and secondary transformer windings of which each series is arranged in a manner heretofore described in FIG. 1 of the drawings, and each series is denoted in FIG. 2 schematically by the reference characters 38.

The primary windings of each of the series 38 are coupled as described heretofore to the constant current device 26', the constant current devices in turn are coupled in parallel by means of their outlet conductors 28', in this example, to a group of common conductors 40, respectively. The common conductors 40 are in turn connected in parallel to a third group of conductors 44 in which are disposed respectively, suitable circuit breakers indicated generally by the reference character 46. A similar group of additional position indicating devices 38 can be coupled in parallel with those shown, for example, by coupling their leads to partial conductors 42 which are extensions of the conductors 44, respectively. The groups of conductors 40, 42, and 44 are so arranged that all except one of the primary circuits or groupings associated with each element 36 and comprising, as illustrated in FIG. 1, four of the primary windings 10 and a choke coil 30, are connected through a pair of buses 50 to a suitable power supply presently to be described. The remaining primary circuits denoted by the reference character 48 and associated individually with each of the movable elements 36, are coupled in parallel through conductors 52 and 54 through suitable switching means to the aforesaid power supply and to an emergency power supply presently to be described.

More specifically, all of the primary circuits associated with each of the movable elements 36, with the exception of the primary circuits indicated as aforesaid at 48, are coupled directly to a source of fluctuating potential 56 through the conductors 50 and electrical leads 58 and 60 in which are connected suitable switching means 62. The remaining primary circuits 48 are coupled in parallel to the source 56 by electric leads 54 and another switching means 66 coupled therein.

The aforementioned emergency power supply includes in this example a battery 68 or other source of emergency electric power, an electric motive means 70 and an alternator 72 coupled in driven relationship to the motive means 70. In this example, the alternator 72 is capable of generating a fluctuating potential approximately equal to that supplied by the source 56. It should be noted at this point that by the term "fluctuating potential" any alternating or pulsating voltage is contemplated which is capable of producing a usable transformer effect. The battery 68 is coupled through the relay contacts 74 to the field and armature circuits of the motive means 70, as indicated schematically by conductors 76. The relay contacts 74 are maintained normally at an open circuit position as shown, by the relay coil 78 which is coupled across the leads 58 and 60 of the fluctuating potential source 56. Accordingly, when power from the source 56 fails, and with the operating switch 80 in the battery circuit in its closed position, the relay contacts 74 will close whereupon the motive means 70 and the alternator 72 coupled thereto are actuated. At the same time, deenergization of the relay coil 78 also closes relay contacts 82 which are coupled in series with another relay coil 84 across the output leads 86 and 88 of the generator. The closure of the switch 82 energizes the relay coil 84, which is arranged to close the normally open relay contacts 90 coupled in the alternator leads 86 and 88, whereby emergency power is furnished to the primary circuit 48 of each of the movable elements 36 by means of the conductors 54 and 52. Simultaneously, the relay coil 84 opens its normally closed contacts 64 and as a result, the remaining primary circuits associated with each of the movable elements 36 are decoupled from the emergency power supply. As a result, only one primary circuit 48 is energized of each of the series 38 of primary and secondary windings associated respectively with the elements 36 and accordingly, a minimum of four lamps 16 (FIG. 1) for each element 36 are energizible in this arrangement when the emergency power supply is operating as aforesaid. As indicated heretofore, the lamps energized by the primary circuit 48 desirably are spaced equidistantly along the path of each of the elements so that a rough indication of the positions occupied by the elements is shown during a power failure in the main power supply 56.

It is additionally contemplated by the invention, that circuit means be associated with either of the position indicating arrangements illustrated in FIGS. 1 and 2 of the drawings for operating a separate visual indicia or, alternatively, an audible alarm, or both when the associated element 12 or 36 has reached a predetermined position in its path of movement. For purposes of explanation, these predetermined positions are selected at the bottom end of the path of the element 12 (FIG. 1) or at the extreme right positions of the elements 36 (FIG. 2). However, these predetermined positions can be selected at any point along the paths which corresponds to the lowermost lamp 16 which is extinguished when the element is at that point, as will be made more apparent hereinafter.

One form of the aforesaid circuit means is illustrated in FIG. 2 of the drawings, and comprises trigger circuit denoted generally by the reference character 92, the input signal for which is supplied through electric leads 94 and 96 which are coupled across, in this example, the lowermost one 16a (FIG. 1) of the series of electric lamps 16. The supply voltage for the trigger circuit 92 is supplied through conductors 98 which are coupled to the conductors 54 in order that the trigger circuit 92 can be energized when the position indicating arrangement is coupled either to the normal power source 56 or to the emergency power supply energized from the battery 68. In this example of the invention, the trigger circuit is arranged in a known manner to furnish an output voltage through conductors 100 which is capable of energizing suitable electric indicia 102 including, for example, another electric lamp or an electric audible alarm means. The circuit 92, in this example, is arranged to produce the aforesaid output only when the signal, as represented by the voltage across the lowermost lamp 16a, has been reduced to a predetermined value which is less than that required to energize the lamp 16a. This value desirably is greater than the voltage induced within the associated secondary winding 14a (FIG. 1) as a result of a purely air-gap coupling between the secondary winding 14a and its associated primary winding. In one arrangement of the invention, the amplifying circuit 92 includes a known magnetic amplifying system which is tripped when the input signal supplied thereto through the conductors 94 and 96 is lowered to 0.5 volt. For example, the magnetic amplifier can be biased to cut-off by the input signal supplied through lead 94 and 96 until the signal falls to one-half volt. Under conditions wherein a voltage of this magnitude is induced in the secondary winding 14a, the associated lamp 16a will be lighted dimly, if at all, and the upper end 104 of the element 12 (FIG. 1) will have just passed below the lowermost secondary winding 14a. At this point the electric indicia 102 is energized by the trigger circuit 92 to indicate that the associated element 12 or 36, as the case may be, is precisely at its predetermined position as aforesaid.

In a similar manner, the conductors 94 and 96 can be coupled across any one of the lamps 16 and the corresponding secondary winding 14 associated with another of the primary windings 10, for example, any one of the remaining primary windings 10a. Accordingly, the predetermined position of the moving element will be indicated relative to the selected one of the primary windings 10a regardless of whether the indicating arrangement is being operated from the normal power supply 56 or from the emergency power supply 68. In a similar manner, the trigger circuit 92 can be associated with any one of the remaining lamps 16 if it is desired that the amplifying circuit 92 be energized only when the indicating arrangement is operated by the normal power supply 56. Thus, it is apparent that the alarm indicia 102 can be energized to indicate that the moving element 12 or 36 has reached a preselected position adjacent any one of the primary windings 10, by connecting the signal leads 94 and 96 across the associated one of the lamps 16.

From the foregoing it is apparent that novel and efficient arrangements of a position indicator have been disclosed herein. The position indicator is arranged in exemplary forms thereof for use either with a single moving element or with a plurality of such elements and affords operating personnel, an instantaneous and continuous, visual representation of the positions occupied throughout the movement of these elements. The descriptive terminology and illustrative matter which are employed herein are presented for purposes only of exemplifying the principles of the invention and are not intended to be limitative thereof. As a consequence, numerous embodiments of the invention will occur to those skilled in the art without departing from the spirit and scope of the invention. Moreover, it is to be understood that certain features of the invention can be employed without a corresponding use of other features.

Therefore, what is claimed as new is:

1. A position indicating arrangement for determining the position of an element moving along a prescribed path, said element being fabricated at least partially from a magnetic material, said arrangement comprising at least one primary winding disposed along the length of said path, a plurality of secondary windings juxtaposed to said primary winding and spaced along the length of said path, an electric indicating device coupled to each of said secondary windings and arranged respectively in positions corresponding to the location of said secondary windings along said path, said devices in addition being arranged in a path having substantially the same configuration as the path of movement of said element so that the energized ones of said devices indicate the position of said element, and circuit means for connecting said primary winding to a source of electric potential.

2. A position indicating arrangement for determining the position of an element movable along a prescribed path, said element being fabricated at least partially from a magnetic material, said arrangement comprising a plurality of transformers, each having its primary and secondary windings disposed along the length of said path, electrical indicating devices coupled respectively to said secondary windings and arranged respectively in positions corresponding to the location of said secondary windings along said path, said devices in addition being arranged in a path of substantially the same configuration as the path of movement of said element so that the energized ones of said devices indicate the position of said element, and circuit means for connecting, said primary windings to a source of electric potential.

3. A position indicating arrangement for determining the position of an element movable along a prescribed path, said element being fabricated at least partially from a magnetic material, said arrangement comprising a plurality of transformers, each having its primary and secondary windings disposed along portions of the length of said path, an electric indicating device coupled to each of said secondary windings, said primary windings being coupled electrically into a plurality of discrete groupings, and circuit means for connecting each of said groupings to a source of electric potential.

4. A position indicating arrangement for determining the position of an element movable along a prescribed path, said element being fabricated at least partially from a magnetic material, said arrangement comprising a plurality of transformers, each having its primary and secondary windings disposed along portions of the length of said path, said transformers being equally spaced from one another along the length of said path, an electric indicating device coupled to each of said secondary windings, said primary windings being coupled electrically into a plurality of discrete groupings, the primary windings of each said groupings being disposed at intervals along the length of said path, said intervals between those primary windings in each of said groups being greater than the distance between the primary windings of adjacent transformers, and circuit means for connecting each of said groupings to a source of electric potential.

5. A position indicating arrangement for determining the position of an element movable along a prescribed path, said element being fabricated at least partially from a magnetic material, said arrangement comprising a plurality of transformers, each having its primary and secondary windings disposed along the length of said path, an electric indicating device coupled to each of said secondary windings, said primary windings being coupled electrically into a plurality of discrete groupings, each of said groupings being approximately equal in number of component primary windings and having said component windings spaced equidistantly along substantially the total portion of said path comprised of said primary windings, and circuit means for connecting each of said groupings to a source of electric potential.

6. A position indicating arrangement adapted for determining the position of an element movable through a prescribed path, said element being fabricated at least partially from a magnetic material, said arrangement comprising a plurality of primary windings spaced along the length of said path, a plurality of secondary windings juxtaposed to said primary windings and spaced along the length of said path, electric indicia coupled individually to said secondary windings, said primary windings being coupled electrically into discrete groupings, a source of fluctuating electric potential coupled to some of said groupings and to the remainder of said groupings through switching means, and an auxiliary power supply coupled through said switching means to said remainder only of said groupings.

7. A position indicating arrangement for determining the position of an element movable through a prescribed path, said element being fabricated at least partially from a magnetic material, said arrangement comprising a plurality of primary windings spaced along the length of said path, a number of secondary windings juxtaposed to said primary windings and spaced along the length of said path, electric indicia connected individually to said secondary windings, a trigger circuit coupled across one of said indicia, alarm means connected to said trigger circuit, said trigger circuit being arranged to energize said alarm means when the voltage drop across said one of said indicia is between that required to energize said one indicium and that induced solely by air coupling between the primary and secondary windings associated with said one indicium.

8. A position indicating arrangement for determining the position of an element movable through a prescribed path, said element being formed at least partially of a magnetic material, said arrangement comprising a plurality of primary windings spaced along the length of said path, a number of secondary windings juxtaposed to said primary windings and spaced along the length of said path, electric indicia coupled individually to said secondary windings, said primary windings being connected electrically into discrete groupings, said groupings being coupled to a source of fluctuating potential, at least one of said groupings being coupled to an auxiliary source of fluctuating potential, a trigger circuit coupled across one of the electric indicia associated with said last-mentioned grouping, electric alarm means coupled to said trigger circuit, said trigger circuit being arranged to energize said alarm means when the voltage drop across said one of said indicia is less than that required to actuate said indicia but greater than that due solely to the voltage drop induced in said one of said indicia solely by air coupling of the primary and secondary windings associated with said indicia.

References Cited in the file of this patent

UNITED STATES PATENTS

| | | |
|---|---|---|
| 1,984,939 | Nachumsohn | Dec. 18, 1934 |
| 2,026,299 | Boyd | Dec. 31, 1935 |
| 2,098,002 | Guerin | Nov. 2, 1937 |
| 2,310,999 | Schierenbeck | Feb. 16, 1943 |
| 2,401,175 | Morrill | May 28, 1946 |
| 2,569,106 | James | Sept. 25, 1951 |
| 2,911,632 | Levine | Nov. 3, 1959 |

FOREIGN PATENTS

| | | |
|---|---|---|
| 619,693 | France | Jan. 5, 1927 |
| 424,769 | Great Britain | Feb. 28, 1935 |
| 630,942 | Great Britain | Oct. 24, 1949 |